(12) United States Patent
Alarcon

(10) Patent No.: US 10,651,684 B2
(45) Date of Patent: May 12, 2020

(54) METHOD, SYSTEM AND DEVICE FOR INDUCTIVELY CHARGING BATTERIES IN ELECTRONIC CIGARETTES

(71) Applicant: LOEC, Inc., Greensboro, NC (US)

(72) Inventor: Ramon Alarcon, Los Gatos, NC (US)

(73) Assignee: Fontem Holdings 4 B.V., Amsterdam (NL)

( * ) Notice: Subject to any disclaimer, the term of this patent is extended or adjusted under 35 U.S.C. 154(b) by 0 days.

(21) Appl. No.: 14/711,698

(22) Filed: May 13, 2015

(65) Prior Publication Data

US 2015/0333561 A1 Nov. 19, 2015

Related U.S. Application Data

(60) Provisional application No. 61/992,697, filed on May 13, 2014.

(51) Int. Cl.
*A24F 47/00* (2020.01)
*H02J 50/10* (2016.01)
*H02J 50/40* (2016.01)
*H02J 7/00* (2006.01)

(52) U.S. Cl.
CPC ............ *H02J 50/10* (2016.02); *A24F 47/008* (2013.01); *H02J 7/0042* (2013.01); *H02J 50/40* (2016.02)

(58) Field of Classification Search
CPC .......... H02J 50/10; H02J 50/40; H02J 7/0042; H02J 7/025; A24F 47/008
See application file for complete search history.

(56) References Cited

U.S. PATENT DOCUMENTS

| | | | |
|---|---|---|---|
| 2007/0279002 A1* | 12/2007 | Partovi | H02J 7/0027 320/115 |
| 2008/0211455 A1 | 9/2008 | Park et al. | |
| 2011/0215755 A1* | 9/2011 | Hwang | H02J 7/00 320/108 |
| 2011/0265806 A1 | 11/2011 | Alarcon et al. | |
| 2011/0304220 A1* | 12/2011 | Whitehead | H01F 21/08 307/104 |

(Continued)

FOREIGN PATENT DOCUMENTS

| | | |
|---|---|---|
| CN | 201094280 Y | 8/2008 |
| CN | 102970885 A | 3/2013 |

(Continued)

OTHER PUBLICATIONS

"Weight". Dictionary.com Unabridged. Random House, Inc. Apr. 26, 2018, accessed at Dictionary.com. (Year: 2018).*

(Continued)

*Primary Examiner* — Joseph S Del Sole
*Assistant Examiner* — Jamel M Nelson
(74) *Attorney, Agent, or Firm* — Dykema Gossett PLLC

(57) ABSTRACT

A system, a method, and a device for inductive charging of batteries in electronic articles, and more particularly for the inductive charging of batteries in electronic cigarettes. In one embodiment, a charging system for an electronic cigarette can comprise a pack comprising a pack battery electrically coupled to a charging coil. The pack can be configured to hold an electronic cigarette battery and the charging coil can be configured to charge the electronic cigarette battery.

10 Claims, 5 Drawing Sheets

(56) References Cited

U.S. PATENT DOCUMENTS

| | | | |
|---|---|---|---|
| 2013/0298922 A1* | 11/2013 | Xiang | A24F 47/008 |
| | | | 131/329 |
| 2013/0300350 A1 | 11/2013 | Xiang | |
| 2013/0336358 A1 | 12/2013 | Liu | |
| 2014/0020697 A1* | 1/2014 | Liu | A24F 15/00 |
| | | | 131/329 |
| 2014/0224267 A1 | 8/2014 | Levitz et al. | |
| 2015/0333561 A1* | 11/2015 | Alarcon | H02J 7/0042 |
| | | | 131/329 |

FOREIGN PATENT DOCUMENTS

| | | | |
|---|---|---|---|
| EP | 2573900 | * 3/2013 | H02J 7/00 |
| EP | 2573900 A1 | 3/2013 | |
| WO | WO201137453 A2 | 3/2011 | |
| WO | 2016/012795 A1 | 1/2016 | |

OTHER PUBLICATIONS

"Magnet". Dictionary.com Unabridged. Random House, Inc. Apr. 26, 2018, accessed at Dictionary.com. (Year: 2018).*

Chinese search report, corresponding to Applicant's CN application No. 2015800250495, dated Aug. 3, 2018.

Chinese Second Office Action, corresponding to Applicant's CN application No. 2015800250495, dated Apr. 16, 2019 (22 pages).

* cited by examiner

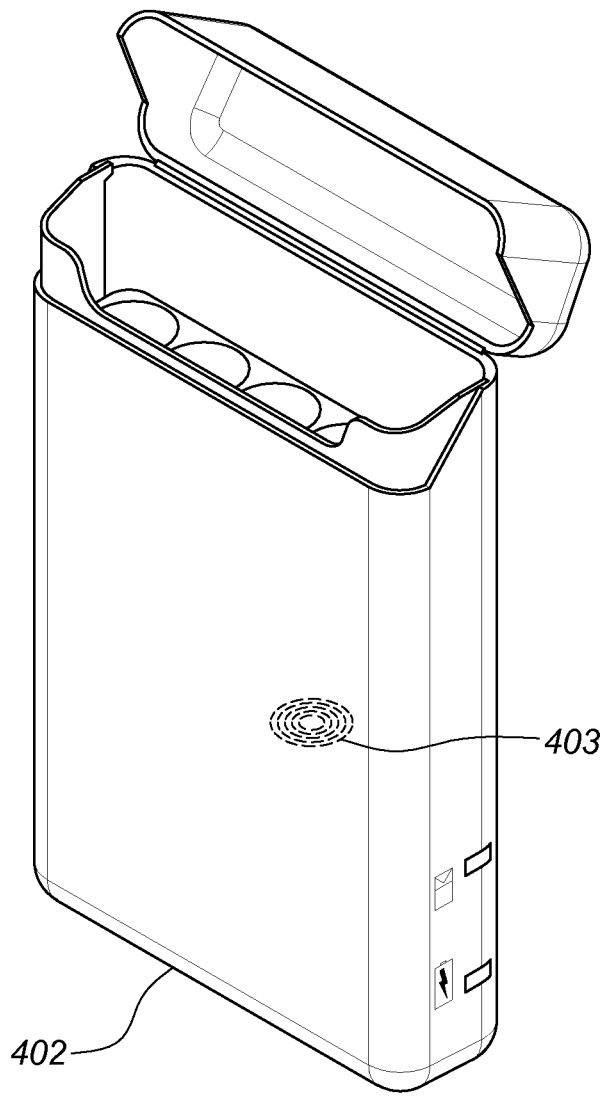 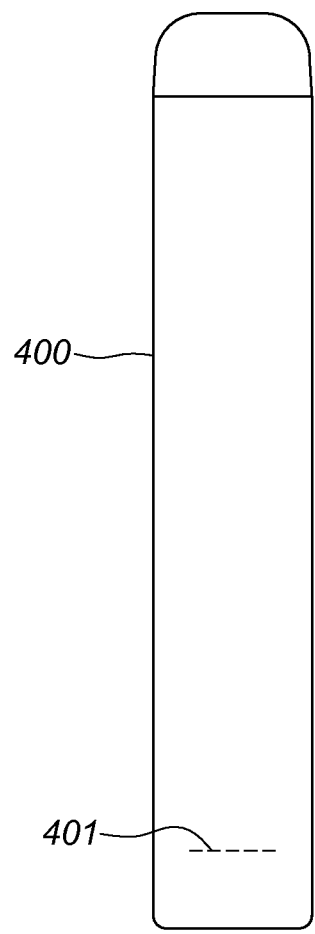
FIG. 4A  FIG. 4B

METHOD, SYSTEM AND DEVICE FOR INDUCTIVELY CHARGING BATTERIES IN ELECTRONIC CIGARETTES

CROSS-REFERENCE TO RELATED APPLICATIONS

This application claims the benefit of U.S. provisional application No. 61/992,697, filed 13 May 2014, which is hereby incorporated by reference as though fully set forth herein.

FIELD OF THE DISCLOSURE

The present disclosure relates to a system, a method, and a device inductively charging the batteries of electronic articles, and more particularly for inductively charging the batteries in an electronic cigarette.

BACKGROUND OF THE DISCLOSURE

Electronic cigarettes, also known as e-cigarette (eCigs) and personal vaporizers (PVs), are electronic inhalers that vaporize or atomize a liquid solution into an aerosol mist that may then be delivered to a user. A typical eCig has two main parts—a housing holding a battery and a cartomizer. The housing holding the battery typically includes a rechargeable lithium-ion (Li-ion) battery, a light emitting diode (LED), and a pressure sensor. The cartomizer typically includes a liquid solution, an atomizer and a mouthpiece. The atomizer typically includes a heating coil that vaporizes the liquid solution.

For safety reasons, the rechargeable battery is not directly connected to external contacts. Instead, a diode and a field effect transistor (FET) are connected in series with the battery connection. When a FET is used, the FET is turned on once a charging process is detected for the eCig. The eCig may be charged by placing the eCig in a charging station that is configured to receive the particular eCig. The charging station may include a charging circuit that is configured to supply power to the eCig to charge the battery.

SUMMARY OF THE DISCLOSURE

The present disclosure provides systems, methods, devices, and computer programs for charging a battery in an electronic cigarette.

In one embodiment, a charging system for an electronic cigarette comprises a pack comprising a pack battery electrically coupled to a charging coil. The pack can be configured to hold an electronic cigarette battery and the charging coil can be configured to charge the electronic cigarette battery.

In another embodiment, an electronic cigarette comprises a body, a power supply unit disposed within said body, a sensor electrically connected to the power supply unit, and a charging coil electrically connected to the power supply unit. The charging coil can be configured to interact with an external inductive charging coil to charge the power supply unit.

In another embodiment, an electronic charging system comprises an electronic cigarette comprising a body, a power supply unit disposed within said body, a sensor electrically connected to the power supply unit, and a charging coil electrically connected to the power supply unit. The charging coil can be configured to interact with an external inductive charging coil to charge the power supply unit. The electronic charging system can further comprise a charging mat comprising a mat coil. The charging mat can be configured to inductively charge the electronic cigarette.

Additional features, advantages, and embodiments of the disclosure may be set forth or apparent from consideration of the detailed description and drawings. Moreover, it is to be understood that the foregoing summary of the disclosure and the following detailed description, drawings, and attachment are exemplary and intended to provide further explanation without limiting the scope of the disclosure as claimed.

BRIEF DESCRIPTION OF THE DRAWINGS

The accompanying drawings, which are included to provide a further understanding of the disclosure, are incorporated in and constitute a part of this specification, illustrate embodiments of the disclosure and together with the detailed description serve to explain the principles of the disclosure. No attempt is made to show structural details of the disclosure in more detail than may be necessary for a fundamental understanding of the disclosure and the various ways in which it may be practiced. In the drawings:

FIG. 4A is an isometric view of one embodiment of a rechargeable pack.

FIG. 4B is a side view of another embodiment of an electronic smoking device.

DETAILED DESCRIPTION OF THE DISCLOSURE

Figure 1A:
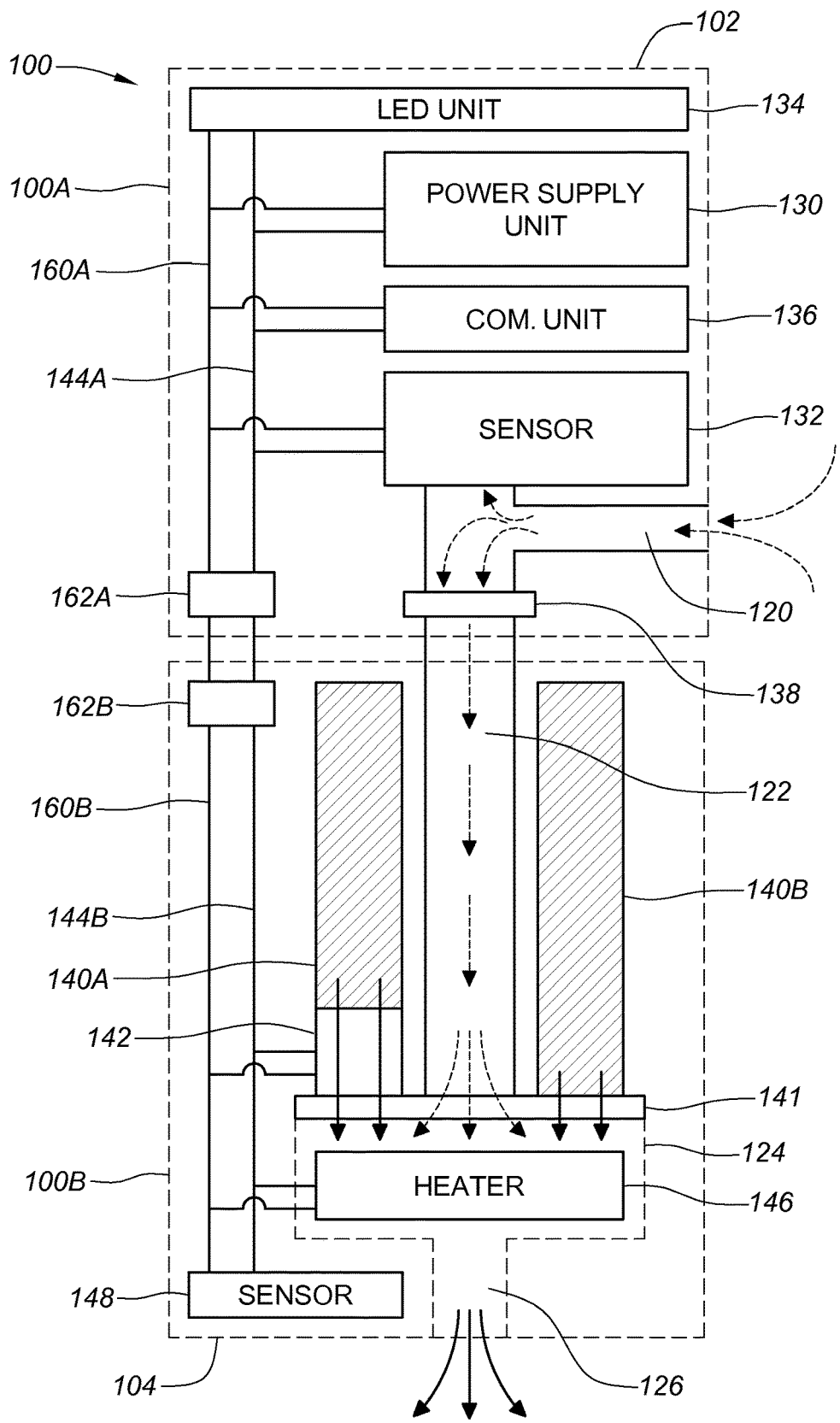
FIG. 1A depicts a structural overview of an electronic smoking device constructed according to the principles of the disclosure.

The disclosure and the various features and advantageous details thereof are explained more fully with reference to the non-limiting embodiments and examples that are described and/or illustrated in the accompanying drawings and detailed in the following. It should be noted that the features illustrated in the drawings are not necessarily drawn to scale, and features of one embodiment may be employed with other embodiments as the skilled artisan would recognize, even if not explicitly stated herein. Descriptions of well-known components and processing techniques may be omitted so as to not unnecessarily obscure the embodiments of the disclosure. The examples used herein are intended merely to facilitate an understanding of ways in which the disclosure may be practiced and to further enable those of skill in the art to practice the embodiments of the disclosure. Accordingly, the examples and embodiments herein should not be construed as limiting the scope of the disclosure. Moreover, it is noted that like reference numerals represent similar parts throughout the several views of the drawings.

Figure 2:
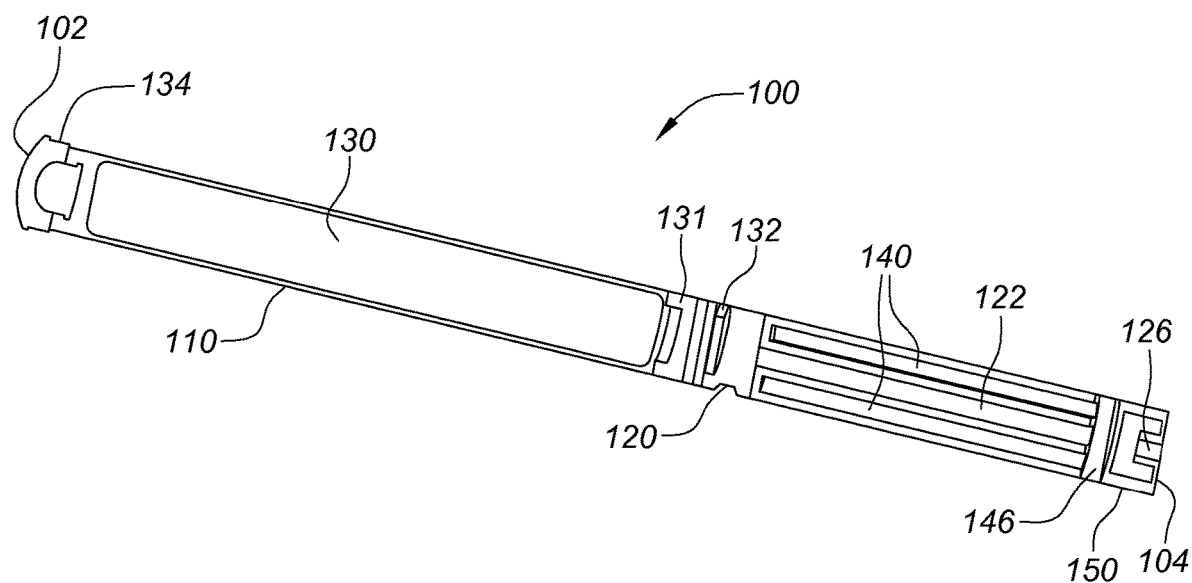
FIG. 2 is a cross-section view of a design of the electronic smoking devices shown in FIGS. 1A and 1B.

FIG. 1A shows a structural overview of an electronic cigarette (eCig) 100 constructed according to the principles of the disclosure. The eCig 100 may be disposable or reusable. The eCig 100 may have a multi-body construction including two or more bodies. For example, the eCig 100 may be a reusable eCig including a first body 100A and a second body 100B and/or the like, that may be easily connected to and disconnected from each other anytime without using any special tools. For example, each body may include threaded parts. Each body may be covered by a different housing. The second body 100B may contain consumable material, such as, e.g., smoking liquid and/or the like. When the consumable material is fully consumed, the second body 100B may be disconnected from the first body 100A and replaced with a new one. Also, the replacement second body 100B may be a different flavor, strength, type and/or the like. Alternatively, the eCig 100 may have a single body construction, as shown in FIG. 2. Regardless of the construction type, the eCig 100 may have an elongated shape with a first end 102 and a second end 104, as shown in FIG. 2, which may be similar to a conventional cigarette shape. Other non-conventional cigarette shapes are also contemplated. For example, the eCig 100 may have a smoking pipe shape or the like.

The eCig 100 may include an air inlet 120, an air flow path 122, a vaporizing chamber 124, a smoke outlet 126, a power supply unit 130, a sensor 132, a container 140, a dispensing control device 141, a heater 146, and/or the like. Further, the eCig 100 may include a controller, such as, e.g., microcontroller, microprocessor, a custom analog circuit, an application-specific integrated circuit (ASIC), a programmable logic device (PLD) (e.g., field programmable gate array (FPGA) and the like) and/or the like and basic digital and analog circuit equivalents thereof, which is explained below in detail with reference to FIG. 1B. The air inlet 120 may extend from, for example, an exterior surface of the housing 110 as shown in FIG. 2. The air flow path 122 may be connected to the air inlet 120 and extending to the vaporizing chamber 124. The smoke outlet 126 may be connected to the vaporizing chamber 124. The smoke outlet 126 may be formed at the second end 104 of the eCig 100 and connected to the vaporizing chamber 124. When a user sucks the second end 104 of the eCig 100, air outside the air inlet 120 may be pulled in and moved to the vaporizing chamber 124 via the air flow path 122, as indicated by the dotted arrows in FIG. 1A. The heater 146 may be a solid state heater shown in FIG. 5 or the like, and located in the vaporizing chamber 124. The container 140 may contain the smoking liquid and connected to the vaporizing chamber 124. The container 140 may have an opening connected to the vaporizing chamber 124. The container 140 may be a single container or a group of containers, such as, e.g., containers 140A, 140B and the like, that are connected to or separated from each other.

The dispensing control device 141 may be connected to the container 140 in order to control flow of the smoking liquid from the container 140 to the vaporizing chamber 124. When the user is not smoking the eCig 100, the dispensing control device 141 may not dispense the smoking liquid from the container 140. The dispensing control device 141 may not need any electric power from, for example, the power supply unit 130 and/or the like, for operation.

The power supply unit 130 may be connected to one or more components that require electric power, such as, e.g., the sensor 132, the heater 146, and the like, via a power bus 160. The power supply unit 130 may include a battery (not shown), such as, e.g., a rechargeable battery, a disposable battery and/or the like. The power unit 130 may further include a power control logic (not shown) for carrying out charging of the battery, detecting the battery charge status, performing power save operations and/or the like. The power supply unit 130 may include a non-contact inductive recharging system such that the eCig 100 may be charged without being physically connected to an external power source. A contact charging system is also contemplated The sensor 132 may be configured to detect the user's action for smoking, such as, e.g., sucking of the second end 104 of the eCig 100, touching of a specific area of the eCig 100 and/or the like. When the user's action for smoking is detected, the sensor 132 may send a signal to other components via a data bus 144. For example, the sensor 132 may send a signal to turn on the heater 146. Also, the sensor 132 may send a signal to the active dispensing device 142 (if utilized) to dispense a predetermined amount of the smoking liquid to the vaporizing chamber 124. When the smoking liquid is dispensed from the container 140 and the heater 146 is turned on, the smoking liquid may be mixed with the air from the air flow path 122 and vaporized by the heat from the heater 146 within the vaporizing chamber 124. The resultant vapor (i.e., smoke) may be pulled out from the vaporizing chamber 144 via the smoke outlet 126 for the user's oral inhalation, as indicated by solid arrows in FIG. 1A. In order to prevent the smoke generated in the vaporizing chamber 144 from flowing towards the air inlet 120, the air flow path 122 may include a backflow prevention screen or filter 138.

When the user's action for smoking is stopped, the sensor 132 may send another signal to turn off the heater 146, the active dispensing device 142, and/or the like, and vaporization and/or dispensing of the smoking liquid may stop immediately. In an alternative embodiment, the sensor 132 may be connected only to the power supply unit 130. When the user's action for smoking is detected, the sensor 132 may send a signal to the power supply unit 130. In response to the signal, the power supply unit 130 may turn on other components, such as, e.g., the heater 146 and the like, to vaporize the smoking liquid.

In an embodiment, the sensor 132 may be an air flow sensor. For example, the sensor 132 may be connected to the air inlet 120, the air flow path 122, and/or the like, as shown in FIG. 1A. When the user sucks the second end 104 of the eCig 100, some of the air pulled in from the air inlet 120 may be moved towards the sensor 132, which may be detected by the sensor 132. Additionally or alternatively, a capacitive sensor 148 may be used to detect the user's touching of a specific area of the housing 100. For example, the capacitive sensor 148 may be formed at the second end 104 of the eCig 100. When the eCig 100 is moved to the user's mouth and the user's lip touches the second end 104, a change in capacitance may be detected by the capacitive sensor 148, and the capacitive sensor 148 may send a signal to activate the heater 146 and the like. Other types of sensors are also contemplated for detecting the user's action for smoking, including, for example, an acoustic sensor, a pressure sensor, a touch sensor, an optical sensor, a Hall Effect sensor, an electromagnetic field sensor, and/or the like.

The eCig 100 may further include a communication unit 136 for wired (e.g., Serial Peripheral Interface or the like) and/or wireless communications with other devices, such as, e.g., a pack 200 (not shown) for the eCig 100, a computer 310 (not shown) and/or the like. The communication unit 136 may also connect the eCig 100 to a wired network (e.g., LAN, WAN, Internet, Intranet and/or the like) and/or a wireless network (e.g., a WIFI network, a Bluetooth network, a cellular data network and/or the like). For example, the communication unit 136 may send usage data, system diagnostics data, system error data, and/or the like to the pack, the computer, and/or the like. To establish wireless communication, the communication unit 136 may include an antenna and/or the like. The eCig 100 may include a terminal 162 for wired communication. The terminal 162 may be connected to another terminal, such as, e.g., a cigarette connector of the pack or the like, in order to exchange data. The terminal 140 may also be used to receive power from the pack or other external power source and recharge the battery in the power supply unit 130.

When the eCig 100 has a multi-body construction, the eCig 100 may include two or more terminals 162 to establish power and/or data connection therebetween. For example, in FIG. 1A, the first body 100A may include a first terminal 162A and the second body 100B may include a second terminal 162B. The first terminal 162A may be connected to a first power bus 160A and a first data bus 144A. The second terminal 162B may be connected to a second power bus 160B and a second data bus 144B. When the first and second bodies 100A and 100B are connected to each other, the first and second terminals 162A and 162B may be connected to each other. Also, the first power bus 160A and the first data bus 144A are connected to the second power bus 160B and the second data bus 144B, respectively. To charge the battery in the power supply unit 130, exchange data and/or the like, the first body 100A may be disconnected from the second body 100B and connected to the pack or the like, which may, in turn, connect the first terminal 162A to the cigarette connector 216 of the pack or the like. Alternatively, a separate terminal (not shown) may be provided to the eCig 100 for charging and/or wired communications with an external device.

The eCig 100 may further include one or more user interface devices, such as, e.g., an LED unit 134, a sound generator (not shown), a vibrating motor (not shown), and/or the like. The LED unit 134 may be connected to the power supply unit 130 via the power bus 160A and the data bus 144A, respectively. The LED unit 134 may provide a visual indication when the eCig 100 is operating. Additionally, when there is an issue and/or problem within the eCig 100, the integrated sensor/controller circuit 132 may control the LED unit 134 to generate a different visual indication. For example, when the container 140 is almost empty or the battery charge level is low, the LED unit 134 may blink in a certain pattern (e.g., blinking with longer intervals for thirty seconds). When the heater 146 is malfunctioning, the heater 146 may be disabled and control the LED unit 134 may blink in a different pattern (e.g., blinking with shorter intervals for one minute). Other user interface devices may be used to show a text, image, and/or the like, and/or generate a sound, a vibration, and/or the like.

Figure 1B:
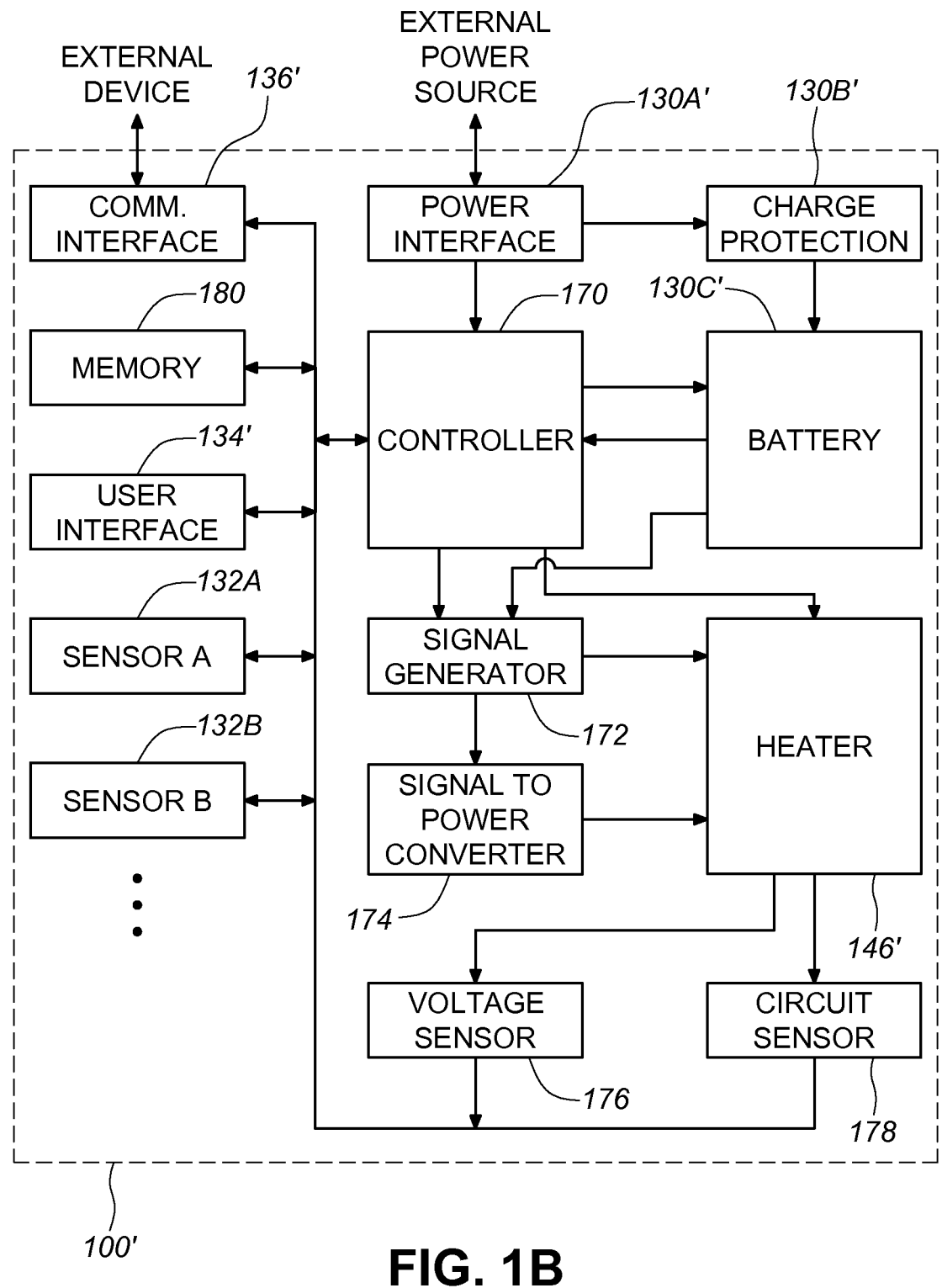
FIG. 1B depicts a schematic overview of another aspect of the electronic smoking device constructed according to the principles of the disclosure.

In the eCig 100 shown in FIG. 1A, the sensor 132 alone may not be able to control the user interface devices, the communication unit 136, the sensors 132 and 148 and/or the like. Furthermore, it may not be possible to carry out more complex and sophisticated operations with the sensor 132 alone. Thus, as noted above, a controller, such as, e.g., microcontroller, microprocessor, a custom analog circuit, an application-specific integrated circuit (ASIC), a programmable logic device (PLD) (e.g., field programmable gate array (FPGA) and the like) and/or the like and basic digital and analog circuit equivalents thereof, may be included the eCig 100. For example, FIG. 1B shows a structural overview of another eCig 100' constructed according to the principles of the disclosure. The eCig 100' may include a controller 170, a signal generator 172, a signal to power converter 174, a voltage sensor 176, a current sensor 178, a memory 180, and/or the like. Further, the eCig 100' may include a power interface 130A', a charge/discharge protection circuit 130B', a battery 130C', one or more sensors (e.g., sensor 132A, sensor 132B and/or the like), a user interface 134', a communication interface 136', a heater 146' and/or the like, which may be similar to the components of the eCig 100 shown in FIG. 1A. Two or more components may be integrated as a single chip, a logic module, a PCB, or the like, to reduce size and manufacturing costs and simplify the manufacturing process. For example, the controller 170 and a sensor 132A may be integrated as a single semiconductor chip.

The controller 170 may perform various operations, such as, e.g., heater calibration, heating parameter adjustment/control, dosage control, data processing, wired/wireless communications, more comprehensive user interaction, and/or the like. The memory 180 may store instructions executed by the controller 170 to operate the eCig 100' and carry out various basic and advanced operations. Further, the memory 180 may store data collected by the controller 170, such as, e.g., usage data, reference data, diagnostics data, error data, and/or the like. The charge/discharge protection circuit 130B' may be provided to protect the battery 130C' from being overcharged, overly discharged, damaged by an excessive power and/or the like. Electric power received by the power interface 130A' may be provided to the battery 130C' via the charge/discharge protection circuit 130B'. Alternatively, the controller 170 may perform the charge/discharge protection operation when the charge/discharge protection circuit 130B' is not available. In this case, the electric power received by the power interface 130A' may be provided to the battery 130C' via the controller 170.

The signal generator 172 may be connected to the controller 170, the battery 130C' and/or the like, and may configured to generate a power control signal, such as, e.g., a current level signal, a voltage level signal, a pulse-width modulation (PWM) signal and the like, to control the power supplied to the heater 146'. Alternatively, the power control signal may be generated by the controller 170. The converter 174 may be connected to the signal generator 172 or the controller 170 to convert the power control signal from the signal generator 172 to an electrical power provided to the heater 146. With this configuration, the power from the battery 130C' may be transferred to the heater 146' via the signal generator 172 or via the signal generator 172 and the converter 174. Alternatively, the power from the battery 130C' may be transferred to the signal generator 172 via the controller 170 and transferred to the heater 146 directly or via the signal to power converter 174.

The voltage sensor 176 and the current sensor 178 may be provided to detect an internal voltage and current of the heater 146', respectively, for heater calibration, heating parameter control and/or the like. For example, each heater 146 may have a slightly different heating temperature, which may be caused by a small deviation in resistance. To produce a more consistent unit-to-unit heating temperature, the integrated sensor/controller circuit 132 may measure a resistance of the heater 146 and adjust heating parameters (e.g., an input current level, heating duration, voltage level, and/or the like) accordingly. Also, the heating temperature of the heater 146 may change while the heater 146 is turned on. The integrated sensor 132/controller 170 circuit may monitor a change in resistance while the heater 146 is turned on and adjust the current level in a real-time basis to maintain the heating temperature at substantially the same level. Further, the integrated sensor 132/controller circuit 170 may monitor whether or not the heater 146 is overheating and/or malfunctioning, and disable the heater 146 for safety purposes when the heating temperature is higher than a predetermined temperature range and/or the heater 146 or other component is malfunctioning.

Figure 3A:
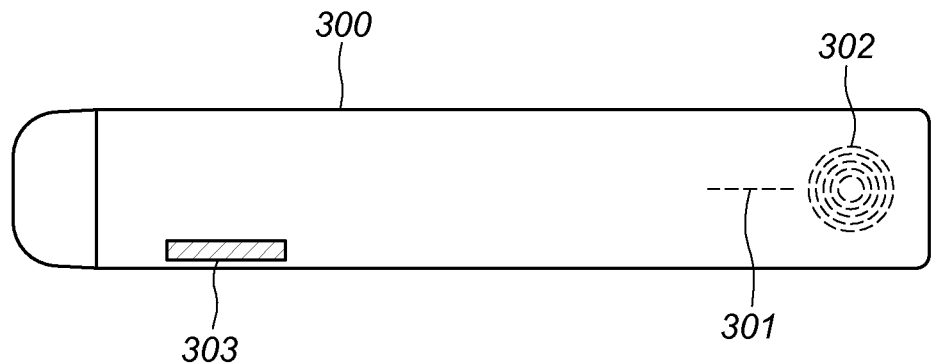
FIG. 3A is a side view of one embodiment of an electronic smoking device.
Figure 3B:
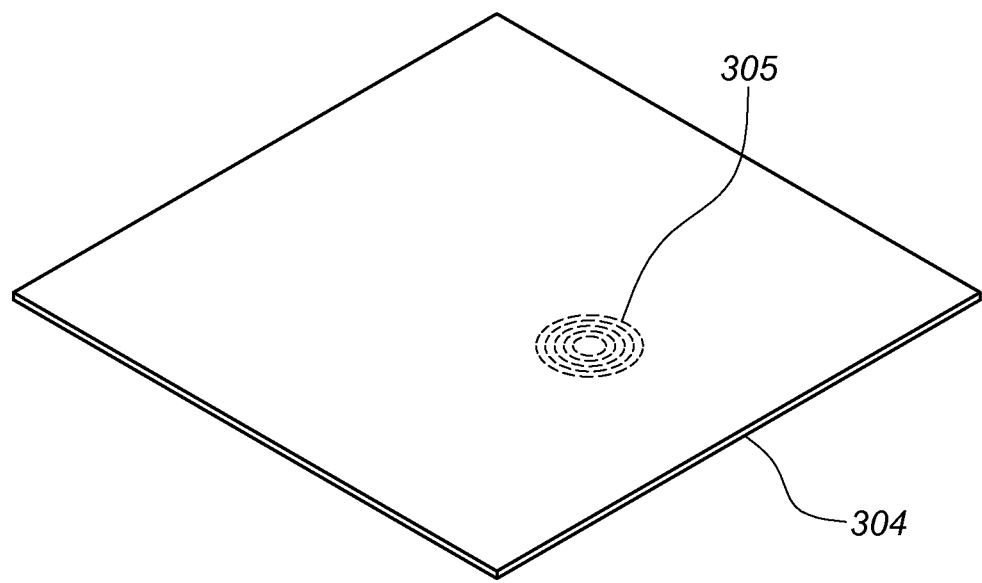
FIG. 3B depicts an isometric view of a charging mat according to the principles of the disclosure.

FIGS. 3A and 3B illustrate an embodiment of an inductive charging system for an eCig. The charging system comprises a charging mat 304, at least one mat coil 305, an eCig 300, and at least one eCig coil 302. The charging mat 304 is configured such that when an eCig 300 with an eCig coil 302 is placed on the charging mat 304 the at least one mat coil 305 electrically interacts with the eCig coil 302 to charge a battery (not shown) included within the eCig 300 This would allow a user to charge the battery in an eCig 300 while not in use without having to otherwise attach the battery to a power source. By simply placing the eCig 300 on top of the charging mat 304 the eCig 300 can recharge. For optimal charging of the eCig 300 a central axis of the eCig coil 302 can be substantially parallel to the central axis of the mat coil 305. In some embodiments the eCig coil 302 is a first eCig coil and the eCig 300 can also comprise a second eCig coil 301 where the second eCig coil 301 has a central axis offset from that of the first eCig coil 302. In other embodiments the eCig 300 can include a plurality of eCig coils where each coil comprises a central axis that is offset from the other coils present within the eCig 300. The offset axes in the embodiment of the eCig 300 with a plurality of eCig coils would increase the ability of the eCig 300 to electrically couple to the mat coil 305 with in the charging mat 304.

In yet another embodiment, the eCig 300 can comprise a weight 303 that is disposed within the eCig 300 and can be configured such that when the eCig 300 is placed on the charging mat 304 the eCig coil 302 will properly align with the mat coil 305. In yet another embodiment the charging mat 304 can be configured such that the eCig 300 will sit on the charging mat 304 so that the eCig coil 302 will be properly aligned with the mat coil 305 for charging of the eCig 300.

FIGS. 4A and 4B illustrate another embodiment of the disclosure where a pack 402 comprises a charging coil 403 with a large enough space in the center of the coil such that the charging coil 403 can surround an outer circumference of an eCig 400 placed within the pack 402. The eCig 400 can also comprise a receiving coil 401. In one embodiment the receiving coil 401 can be placed on an end of the eCig 400 and configured such that the eCig 400 can be placed within the pack 402 and the charging coil will surround the eCig 400 and the receiving coil 401. This can allow for the eCig 400 to be recharged while resting within the pack 402 without relying on any type of direct electrical connection. The type of arrangement described in FIGS. 4A and 4B could also be present in a docking station or other charging stations. A recharging system that like described herein would keep the electrical system of the eCig 400 and the pack 402 free from exposure to elements that may corrode or otherwise degrade the performance of the eCig 400 and the pack 402. In another embodiment the pack 402 can comprise multiple charging coils 403 and can be configured to charge multiple eCigs 400 at one time.

It should be noted that the features illustrated in the drawings are not necessarily drawn to scale, and features of one embodiment may be employed with other embodiments as the skilled artisan would recognize, even if not explicitly stated herein. Descriptions of well-known components and processing techniques may be omitted so as to not unnecessarily obscure the embodiments of the disclosure. The examples used herein are intended merely to facilitate an understanding of ways in which the disclosure may be practiced and to further enable those of skill in the art to practice the embodiments of the disclosure. Accordingly, the examples and embodiments herein should not be construed as limiting the scope of the disclosure. Moreover, it is noted that like reference numerals represent similar parts throughout the several views of the drawings.

A "computer," as used in this disclosure, means any machine, device, circuit, component, or module, or any system of machines, devices, circuits, components, modules, or the like, which are capable of manipulating data according to one or more instructions, such as, for example, without limitation, a processor, a microprocessor, a central processing unit, a general purpose computer, a super computer, a personal computer, a laptop computer, a palmtop computer, a notebook computer, a desktop computer, a workstation computer, a server, or the like, or an array of processors, microprocessors, central processing units, general purpose computers, super computers, personal computers, laptop computers, palmtop computers, notebook computers, desktop computers, workstation computers, servers, or the like.

A "server," as used in this disclosure, means any combination of software and/or hardware, including at least one application and/or at least one computer to perform services for connected clients as part of a client-server architecture. The at least one server application may include, but is not limited to, for example, an application program that can accept connections to service requests from clients by sending back responses to the clients. The server may be configured to run the at least one application, often under heavy workloads, unattended, for extended periods of time with minimal human direction. The server may include a plurality of computers configured, with the at least one application being divided among the computers depending upon the workload. For example, under light loading, the at least one application can run on a single computer. However, under heavy loading, multiple computers may be required to run the at least one application. The server, or any if its computers, may also be used as a workstation.

A "network," as used in this disclosure means, but is not limited to, for example, at least one of a local area network (LAN), a wide area network (WAN), a metropolitan area network (MAN), a personal area network (PAN), a campus area network, a corporate area network, a global area network (GAN), a broadband area network (BAN), a cellular network, the Internet, or the like, or any combination of the foregoing, any of which may be configured to communicate data via a wireless and/or a wired communication medium. These networks may run a variety of protocols not limited to TCP/IP, IRC or HTTP.

Various forms of computer readable media may be involved in carrying sequences of instructions to a computer. For example, sequences of instruction (i) may be delivered from a RAM to a processor, (ii) may be carried over a wireless transmission medium, and/or (iii) may be formatted according to numerous formats, standards or protocols, including, for example, WiFi, WiMAX, IEEE 802.11, DECT, 0G, 1G, 2G, 3G or 4G cellular standards, Bluetooth, or the like.

The terms "including," "comprising" and variations thereof, as used in this disclosure, mean "including, but not limited to," unless expressly specified otherwise.

The terms "a," "an," and "the," as used in this disclosure, means "one or more," unless expressly specified otherwise.

Devices that are in communication with each other need not be in continuous communication with each other, unless expressly specified otherwise. In addition, devices that are in communication with each other may communicate directly or indirectly through one or more intermediaries.

Although process steps, method steps, algorithms, or the like, may be described in a sequential order, such processes, methods and algorithms may be configured to work in alternate orders. In other words, any sequence or order of steps that may be described does not necessarily indicate a requirement that the steps be performed in that order. The steps of the processes, methods or algorithms described herein may be performed in any order practical. Further, some steps may be performed simultaneously.

When a single device or article is described herein, it will be readily apparent that more than one device or article may be used in place of a single device or article. Similarly, where more than one device or article is described herein, it will be readily apparent that a single device or article may be used in place of the more than one device or article. The functionality or the features of a device may be alternatively embodied by one or more other devices which are not explicitly described as having such functionality or features.

What is claimed:

1. A charging system for an electronic cigarette, the system comprising:
    a pack comprising a pack battery electrically coupled to a charging coil;
    wherein the pack is configured to hold an electronic cigarette including an electronic cigarette battery, the electronic cigarette including a first receiving coil and a second receiving coil, the first receiving coil located at an end of the electronic cigarette and having a first central axis parallel to a longitudinal axis of the electronic cigarette, the second receiving coil having a second central axis perpendicular to the first central axis, wherein the charging coil is configured to communicate data and charge the electronic cigarette battery using the first receiving coil, and the second receiving coil is configured to communicate data and charge the electronic cigarette battery wirelessly when aligned with a mat coil of a charging mat.

2. The charging system of claim 1, wherein the charging coil is sized and configured to allow the electronic cigarette battery to fit within a space at the center of the charging coil.

3. The charging system of claim 2, wherein the space at the center of the charging coil is configured to surround the electronic cigarette battery.

4. The charging system of claim 1, wherein the pack is configured to communicate with the electronic cigarette battery.

5. An electronic cigarette, comprising:
    a body, a power supply unit disposed within said body, a sensor electrically connected to the power supply unit, a communication unit electrically connected to the power supply unit, a weight, a first charging coil electrically connected to the power supply unit, and a second charging coil electrically connected to the power supply unit,
    wherein the first charging coil includes a first central axis and the second charging coil includes a second central axis perpendicular to the first central axis, and wherein the weight is configured to align the first charging coil with an external inductive charging coil of a rechargeable pack, wherein the first charging coil is configured to interact with the external inductive charging coil to charge the power supply unit, the communication unit is configured to wirelessly communicate with the rechargeable pack, and the second charging coil is configured to interact with a mat coil of a charging mat.

6. The electronic cigarette according to claim 5, wherein the weight is configured to align the second charging coil with the mat coil.

7. The electronic cigarette according to claim 5, further comprising a third charging coil having a third central axis, wherein the third central axis is perpendicular with the first central axis and is offset from the second central axis, the third charging coil configured for communication with the charging mat.

8. An electronic charging system, comprising:
    an electronic cigarette comprising a body, a power supply unit disposed within said body, a sensor electrically connected to the power supply unit, a communication unit electrically connected to the power supply unit, a weight, a first charging coil having a first central axis, and a second charging coil having a second central axis perpendicular to the first central axis, wherein the first charging coil and the second charging coil are electrically connected to the power supply unit, wherein the first charging coil is configured to interact with an external inductive charging coil to charge the power supply unit; and
    a charging mat comprising a mat coil, wherein the charging mat is configured to inductively charge the electronic cigarette, wherein the weight is configured to align the second charging coil with the mat coil, and wherein the communication unit is configured to wirelessly communicate with the charging mat.

9. The electronic charging system according to claim 8, wherein the weight is configured to align the first charging coil with the external inductive charging coil of a rechargeable pack.

10. The electronic charging system according to claim 8, further comprising a third charging coil having a third central axis, wherein the third central axis is perpendicular with the first central axis and is offset from the second central axis, the third charging coil configured for communication with the charging mat.

* * * * *